United States Patent [19]
Khan et al.

[11] Patent Number: 5,930,075
[45] Date of Patent: Jul. 27, 1999

[54] DISC DRIVE SPINDLE MOTOR HAVING HYDRO BEARING WITH OPTIMIZED LUBRICANT VISCOSITY

[75] Inventors: Raquib U. Khan, Pleasanton; Hans Leuthold; David J. Jennings, both of Santa Cruz; Gregory I. Rudd; Gunter K. Heine, both of Aptos, all of Calif.

[73] Assignee: Seagate Technology, Inc., Scotts Valley, Calif.

[21] Appl. No.: 08/737,437

[22] PCT Filed: Oct. 25, 1996

[86] PCT No.: PCT/US96/17131

§ 371 Date: Oct. 10, 1997

§ 102(e) Date: Oct. 10, 1997

[87] PCT Pub. No.: WO97/16828

PCT Pub. Date: May 9, 1997

Related U.S. Application Data

[60] Provisional application No. 60/008,124, Oct. 30, 1995, abandoned.

[51] Int. Cl.$^6$ .............................. G11B 19/20; H02K 5/16
[52] U.S. Cl. .................................... 360/99.08; 310/90
[58] Field of Search ............................. 360/99.08, 97.02; 369/258; 310/67 R, 90; 585/12

[56] References Cited

U.S. PATENT DOCUMENTS

| | | | |
|---|---|---|---|
| 4,071,252 | 1/1978 | Gillespie | 369/263 |
| 4,106,776 | 8/1978 | Gillespie | 369/266 |
| 4,673,997 | 6/1987 | Gowda et al. | 360/107 |
| 5,022,492 | 6/1991 | Ohno et al. | 184/5 |
| 5,124,060 | 6/1992 | Yokouchi et al. | 252/62.51 R |
| 5,224,782 | 7/1993 | Miwa et al. | 384/100 |
| 5,457,588 | 10/1995 | Hattori et al. | 360/99.08 |
| 5,730,893 | 3/1998 | Wyman et al. | 252/62.52 |
| 5,789,836 | 8/1998 | Hayakawa | 310/90 |

*Primary Examiner*—Craig A. Renner
*Attorney, Agent, or Firm*—Westman, Champlin & Kelly P.A.; David D. Brush; Peter S. Dardi

[57] ABSTRACT

A disc drive data storage system according to the present invention includes a housing, a central axis, a stationary member which is fixed with respect to the housing and coaxial with the central axis, and a rotatable member which is rotatable about the central axis with respect to the stationary member. A stator is fixed with respect to the housing. A rotor is supported by the rotatable member and is magnetically coupled to the stator. At least one data storage disc is attached to and is coaxial with the rotatable member. A hydro bearing interconnects the stationary member and the rotatable member and includes a blend of base fluids. The base fluids in the blend are selected such that one of the base fluids has a viscosity that is greater than a desired viscosity selected for the disc drive, another of the base fluids has a viscosity that is less than the desired viscosity and the blend of base fluids has a viscosity that is within a selected range of the desired viscosity.

16 Claims, 3 Drawing Sheets

DISC DRIVE SPINDLE MOTOR HAVING HYDRO BEARING WITH OPTIMIZED LUBRICANT VISCOSITY

CROSS-REFERENCE TO RELATED APPLICATIONS

This Application claims priority from U.S. Provisional Application Ser. No. 60/008,124, filed Oct. 30, 1995 abandoned.

Cross-reference is hereby made to U.S. application Ser. No. 08/737,438, entitled "Miniature Disc Drive Spindle Motor Having Hydro Bearing With High Shear-Strength Viscosity Index Improved Lubricant" and U.S. application Ser. No. 08/737,439, entitled "Disc Drive Spindle Motor Having Hydro Bearing With Lubricant Optimized With Disc Drive Compatible Additives," which were filed on even date herewith and claim priority from U.S. Provisional Application Ser. No. 60/008,124.

BACKGROUND OF THE INVENTION

The present invention relates to spindle motors for disc drive data storage devices and, more particularly, to optimized lubricating fluids for a hydrodynamic bearing within the spindle motor.

Disc drive data storage devices, known as "Winchester" type disc drives, are well-known in the industry. In a Winchester disc drive, digital data is written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor. Typical spindle motor speeds have been in the range of 3600 RPM. Current technology has increased spindle motor speeds to 7200 RPM, 10,000 RPM and above.

One of the principal sources of noise in disc drive data storage devices is the spindle motor. Disc drive manufacturers have recently begun looking at replacing conventional ball or roller bearings in spindle motors with "hydro" bearings, such as hydrodynamic or hydrostatic bearings. A hydro bearing relies on a fluid film which separates the bearing surfaces and is therefore much quieter and in general has lower vibrations than conventional ball bearings. A hydrodynamic bearing is a self-pumping bearing which generates a pressure internally to maintain the fluid film separation. A hydrostatic bearing requires an external pressurized fluid source to maintain the fluid separation. Relative motion between the bearing surfaces in a hydro bearing causes a shear element which occurs entirely within the fluid film such that no contact between the bearing surfaces occurs.

This situation is unlike typical boundary or elastohydrodynamic lubrication applications such as roller, ball and sliding bearings, where the solid bearing surfaces are often in contact with one another and sheer stress occurs at the interface. In these boundary applications, the primary purpose of the lubricant is to modify the interface to reduce wear and friction. The interfacial chemical properties of the lubricant are the most important.

In hydro bearing applications, entirely different fluid properties are of importance to the function of the bearing. The boundary properties are important only during the starting and stopping of the disc rotation. During normal operation, the most important properties are bulk properties. The hydro bearings that are being considered for use in disc drive applications are miniature units which require small power dissipation and a limited oil supply that must be adequate for a long life without escaping from the bearing. Commercially available lubricants are mostly unsuitable in some way for application in miniature hydro bearings in a disc drive.

The lubricant properties that must be controlled and the degree of control that must be obtained are unique to miniature hydro bearings for disc drives. These properties include power dissipation, viscosity and it's temperature dependence, migration, vapor pressure and evaporation rate, resistance to oxidation and corrosion, rheology, boundary properties and system compatibility. Viscosity determines power dissipation and bearing stiffness, which should be relatively constant over various operating conditions. The lubricant should have low migration so the lubricant does not creep out of the bearing. The lubricant should have a high resistance to oxidation and reactivity to provide a long life for the bearing. Rheology is the deformation and flow response to sheer.

The lubricant should also be compatible with the other materials of the disc drive. For example, migration or outgassing of the lubricant should not impair the interface between the head and the disc, such as by causing an increase in the sticking friction between the head and the disc or a degradation of the head structure or operation. Formulation of fluids for appropriate hydro bearing properties therefore requires different considerations than for fluids intended as general purpose lubricants. Another disadvantage of commercially available lubricants is that the exact composition of the lubricants is often not provided by the manufacturer and may include one or more additives that are incompatible with the sensitive operation of the disc drive.

SUMMARY OF THE INVENTION

The disc drive data storage system of the present invention includes a housing, a central axis, a stationary member which is fixed with respect to the housing and coaxial with the central axis, and a rotatable member which is rotatable about the central axis with respect to the stationary member. A stator is fixed with respect to the housing. A rotor is supported by the rotatable member and is magnetically coupled to the stator. At least one data storage disc is attached to and is coaxial with the rotatable member. A hydro bearing interconnects the stationary member and the rotatable member and includes a blend of base fluids having a viscosity that is within a selected range of a desired viscosity such that the blend of base fluids provides the hydro bearing with a desired power dissipation and stiffness. The blend of base fluids includes a first base fluid having a first viscosity that is greater than the desired viscosity and a second base fluid having a second viscosity that is less than the desired viscosity.

In a preferred embodiment, the desired viscosity is a precise viscosity between 4–10 centipoise (cP) at 70 degrees Celsius. The base fluids are blended to achieve an overall viscosity that is within 10 percent, and most preferably 2–5 percent, of the desired viscosity. In addition, the blend of base fluids has a viscosity index of at least 110 and an evaporation range of less than $1.0 \times 10^{-3}$ mg/day-mm$^2$, based on a volume to surface area (V/A) ratio of about 1.9–2.0 mm.

Preferred base fluids include perfluoropolyethers, esters, synthetic hydrocarbons and highly refined mineral hydrocarbons. Most preferred base fluids include diesters, polyol esters and polyalphaolefins. These base fluids can be mixed in a variety of combinations, such as a combination of esters only, a combination of polyalphaolefins only or a combination of at least one ester and at least one polyalphaolefin only.

The preferred base fluids have been found to offer several advantages over ordinary petroleum-based hydrocarbons that are standard fluid lubricants, such as an improved viscosity-temperature relationship, lower evaporation and vapor pressure, low migration, improved oxidation resistance, similar boundary performance which is easily enhanced with additives, better compatibility with other materials in the disc drive and a better control of all properties due to a known chemical pure composition.

DETAILED DESCRIPTION OF THE PREFERRED EMBODIMENTS

Figure 1:
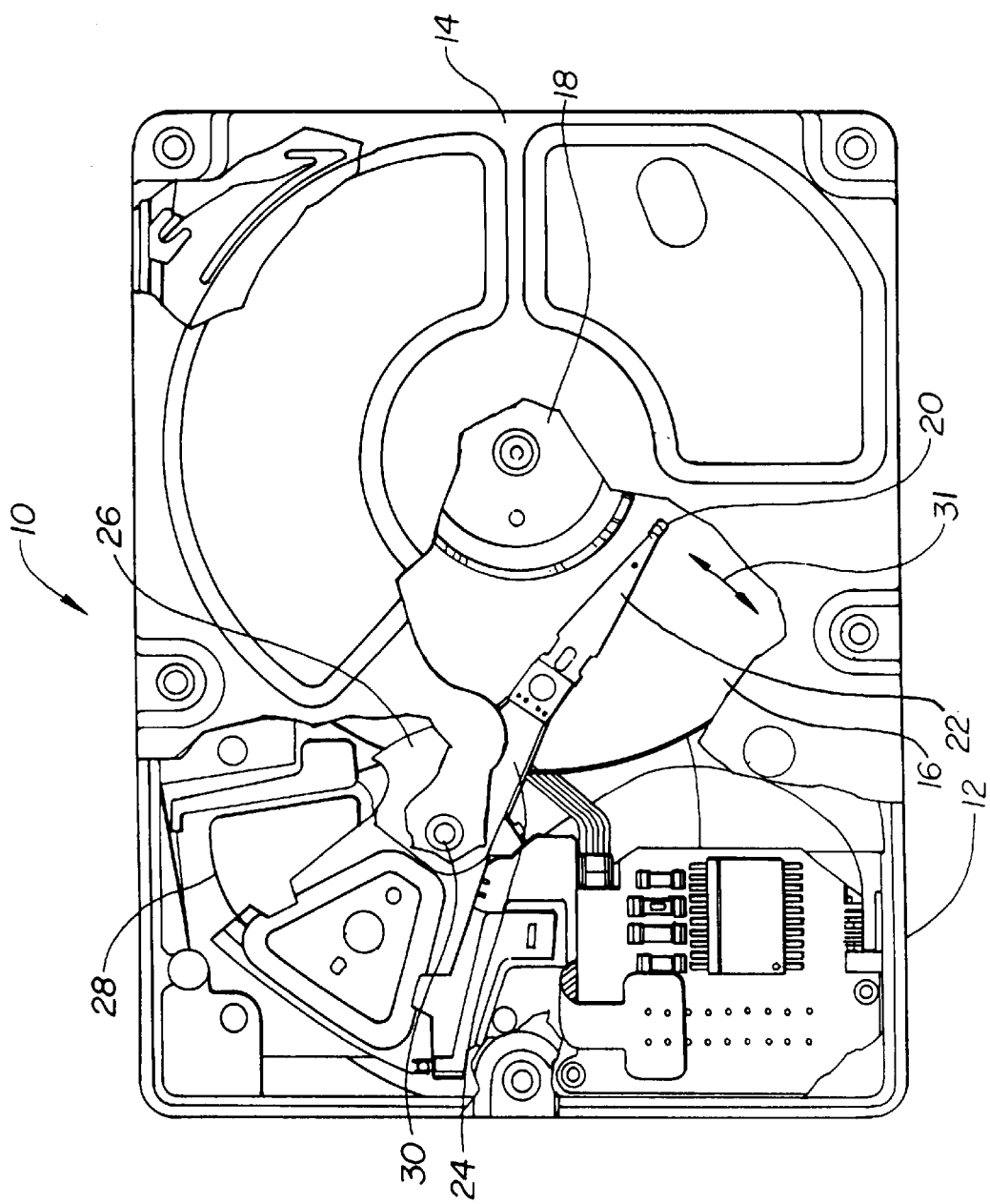
FIG. 1 is a top plan view of a disc drive data storage device, in accordance with the present invention.

The present invention is a disc drive data storage device having a hydrodynamic or hydrostatic bearing spindle motor with a lubricating fluid composition which is optimized for the unique requirements of a disc drive. FIG. 1 is a top plan view of a typical disc drive 10 in which the present invention is useful. Disc drive 10 includes a housing base 12 and a top cover 14. The housing base 12 is combined with top cover 14 to form a sealed environment to protect the internal components from contamination by elements from outside the sealed environment.

Disc drive 10 further includes a disc pack 16 which is mounted for rotation on a spindle motor (not shown) by a disc clamp 18. Disc pack 16 includes a plurality of individual discs which are mounted for co-rotation about a central axis. Each disc surface has an associated head 20 which is mounted to disc drive 10 for communicating with the disc surface. In the example shown in FIG. 1, heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 31. While a rotary actuator is shown in FIG. 1, the present invention is also useful in disc drives having other types of actuators, such as linear actuators.

Figure 2:
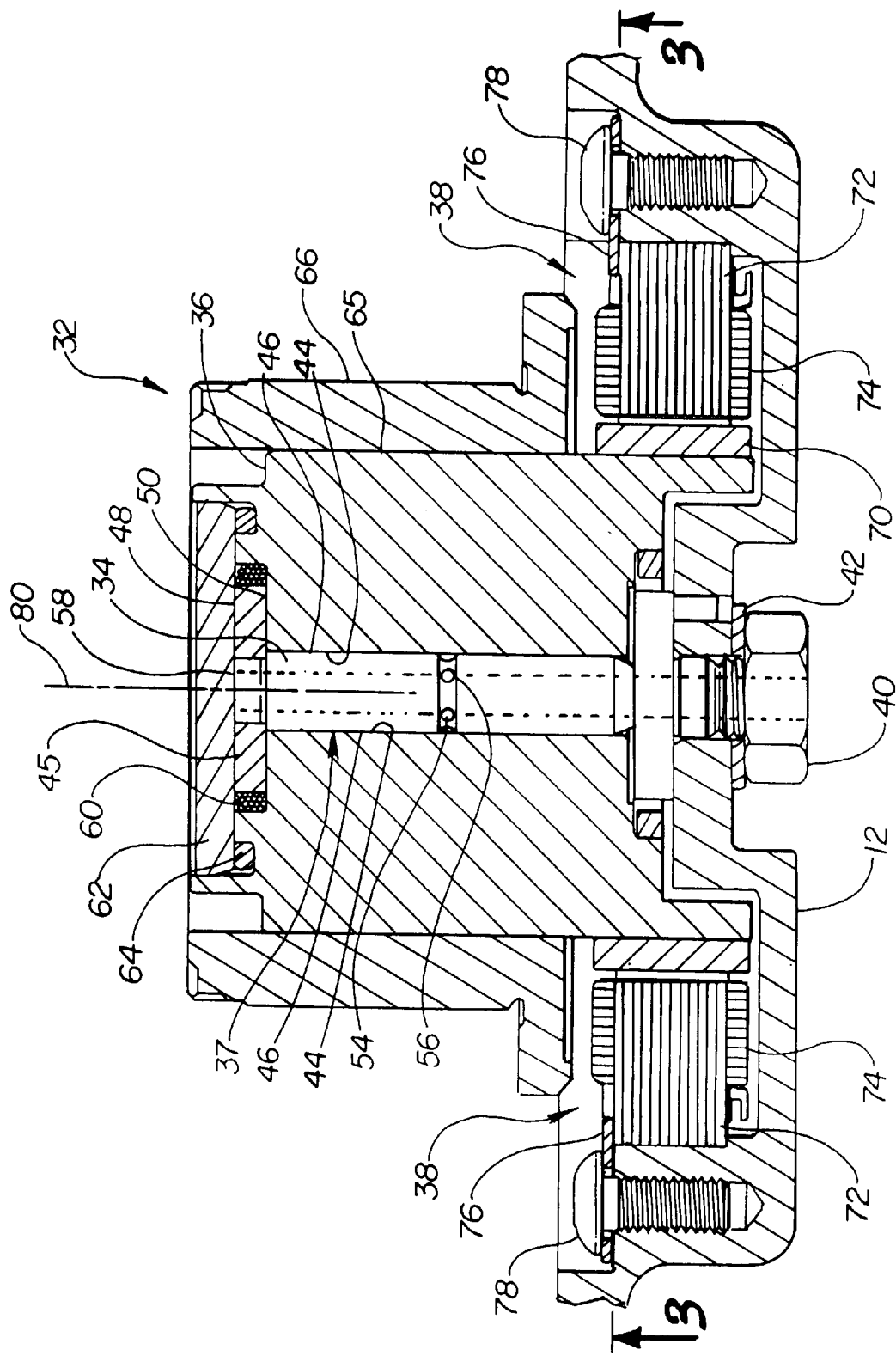
FIG. 2 is a sectional view of a hydrodynamic spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft which is fixed and attached to base 12 through a nut 40 and a washer 42. Hub 36 is interconnected with shaft 34 through a hydrodynamic bearing 37 for rotation about shaft 34. Bearing 37 includes radial working surfaces 44 and 46 and axial working surfaces 48 and 50. Shaft 34 includes fluid ports 54, 56 and 58 which supply lubricating fluid 60 and assist in circulating the fluid along the working surfaces of the bearing. Lubricating fluid 60 is supplied to shaft 34 by a fluid source (not shown) which is coupled to the interior of shaft 34 in a known manner.

Spindle motor 32 further includes a thrust bearing 45 which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a central core 65 and a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Core 65 is formed of a magnetic material and acts as a back-iron for magnet 70. Rotor magnet 70 can be formed as a unitary, annular ring or can be formed of a plurality of individual magnets which are spaced about the periphery of hub 36. Rotor magnet 70 is magnetized to form one or more magnetic poles.

Stator 38 is attached to base 12 and includes stator laminations 72 and a stator windings 74. Stator windings 74 are attached to laminations 72. Stator windings 74 is spaced radially from rotor magnet 70 to allow rotor magnet 70 and hub 36 to rotate about a central axis 80. Stator 38 is attached to base 12 through a known method such as one or more C-clamps 76 which are secured to the base through bolts 78.

Commutation pulses applied to stator windings 74 generate a rotating magnetic field which communicates with rotor magnet 70 and causes hub 36 to rotate about central axis 80 on bearing 37. The commutation pulses are timed, polarization-selected DC current pulses which are directed to sequentially selected stator windings to drive the rotor magnet and control its speed.

In the embodiment shown in FIG. 2, spindle motor 32 is a "below-hub" type motor in which stator 38 has an axial position that is below hub 36. Stator 38 also has a radial position that is external to hub 36, such that stator windings 74 are secured to an inner diameter surface of laminations 72. In an alternative embodiment, the stator is positioned within the hub, as opposed to below the hub. The stator can have a radial position which is either internal to the hub or external to the hub. In addition, the spindle motor of can have a fixed shaft, as shown in FIG. 2 or a rotating shaft. In a rotating shaft spindle motor, the bearing is located between the rotating shaft and an outer stationary sleeve which is coaxial with the rotating shaft.

Figure 3:
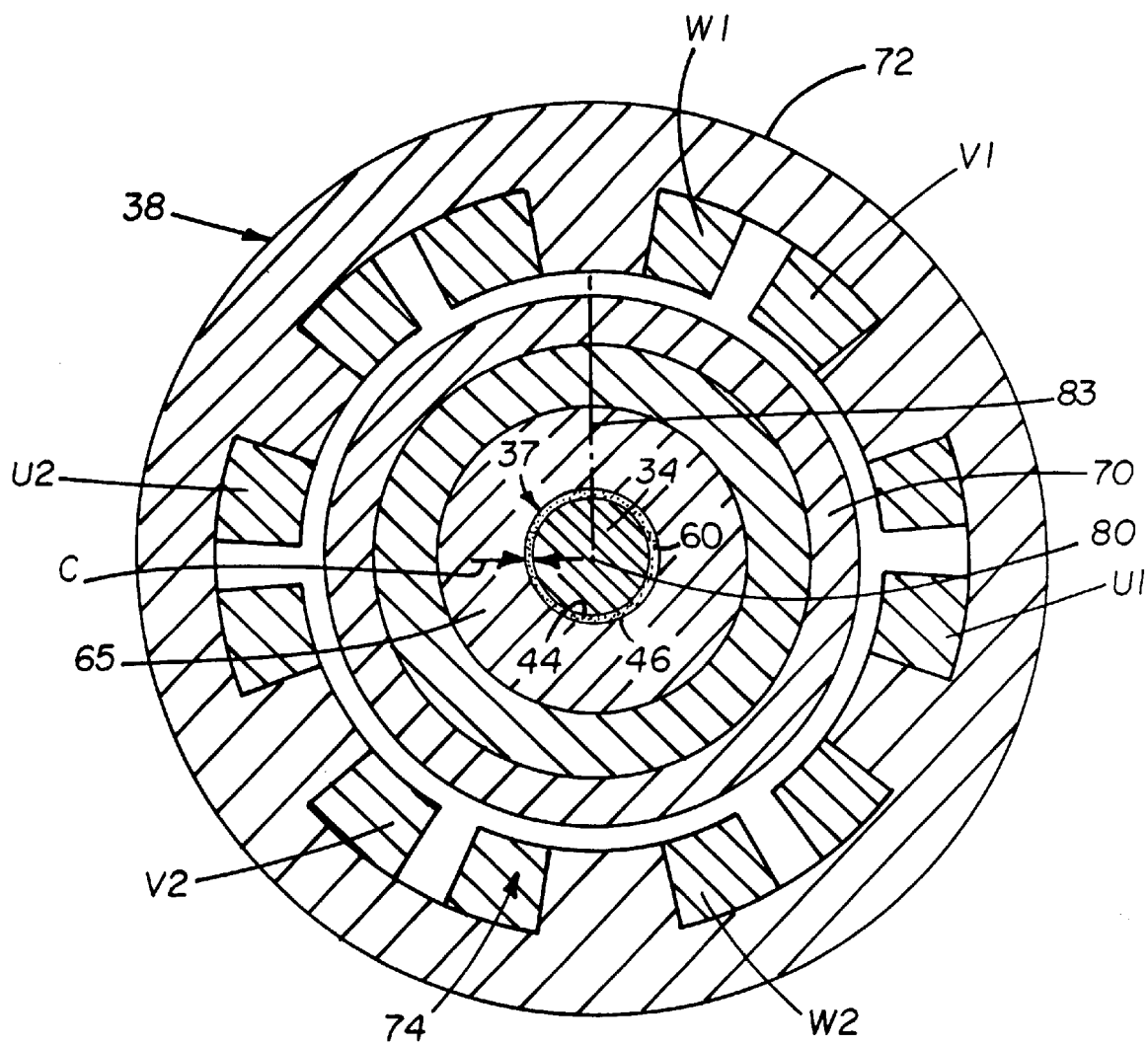
FIG. 3 is a diagrammatic sectional view of the hydrodynamic spindle motor taken along line 3—3 of FIG. 2, with portions removed for clarity.

FIG. 3 is a diagrammatic sectional view of hydrodynamic spindle motor 32 taken along line 3—3 of FIG. 2, with portions removed for clarity. Stator 38 includes laminations 72 and stator windings 74, which are coaxial with rotor magnet 70 and central core 65. Stator windings 74 include phase windings W1, V1, U1, W2, V2 and U2 which are wound around teeth in laminations 72. The phase windings are formed of coils which have a coil axis that is normal to and intersects central axis 80. For example, phase winding W1 has a coil axis 83 which is normal to central axis 80. Radial working surfaces 44 and 46 of hydrodynamic bearing 37 are formed by the outer diameter surface of shaft 34 and the inner diameter surface of central core 65. Radial working surfaces 44 and 46 are separated by lubrication fluid 60, which maintains a clearance c during normal operation.

1. Optimization of Lubricant Viscosity

In accordance with one aspect of the present invention, the lubrication fluid includes a blend of base fluids which are selected to optimize power dissipation and bearing load capacity (i.e. bearing stiffness) for the particular hydrodynamic bearing design in which the fluid is used by precisely defining the fluid viscosity.

Power consumption (P) and bearing stiffness (K) are proportional fluid viscosity according to the relations, $$P \propto \frac{\mu_B \omega^2 R^4}{c}$$

$$K \propto \frac{\mu_B \omega R^4}{c^3}$$

where $\mu_B$ is the absolute viscosity of the blend of fluids, $\omega$ is the rotational velocity of the hub, c is the gap or clearance between radial working surfaces 44 and 46 (or at axial working surfaces 48 and 50) and R is the characteristic length of the radial and/or axial working surfaces.

In disc drive applications having miniature hydrodynamic bearings, power and load capacity are critical. Therefore it is desirable to specify an exact viscosity at any particular temperature for the lubrication fluid, and the desired viscosity varies with the size and structure of the spindle motor. Commercial lubricants are not available with arbitrary viscosity values. The lubrication fluid of the present invention includes a blend of base fluids, with each base fluid having a similar chemical composition but a different viscosity. The base fluids are precisely blended to obtain an overall viscosity which is preferably within 10%, and most preferably within 2–5%, of the desired viscosity. The base fluids are blended according to the following relation, $$\mu_{B \, at \, T-T_c} = \nu_1 \times \rho_1 \times \chi_1 + \mu_2 \times \rho_2 \times \chi_2 \ldots + \ldots \nu_n \times \rho_n \times \chi_n$$

where, $\mu_B$=the absolute viscosity of the blend of base fluids at temperature $T_c$;

$T_c$=the temperature at which the viscosity is desired;

$\nu_n$=the kinematic viscosity of base fluid n;

n=an integer greater than one;

$\rho_n$=the density of base fluid n;

$\chi_n$=the weight percent fraction of base fluid n; and $\chi_1 + \chi_2 \ldots + \ldots \chi_n = 1$.

For example, if n=2 and the desired kinematic viscosity of the blend is $\nu$, then a proper selection of $\nu_1$ and $\nu_2$, with $\nu_1 > \nu > \nu_2$, results in a lubrication fluid of the desired viscosity.

Preferred base fluids include perfluoropolyethers, esters, synthetic hydrocarbons and highly refined (highly purified) mineral hydrocarbons. Most preferred base fluids include diesters, polyolesters and polyalphaolefins (PAO's). These base fluids can be blended in a variety of combinations, but preferred blends include a combination of esters only, a combination of polyalphaolefins only and a combination of at least one ester and at least one polyalphaolefin only. A single ester or polyalphaolephin can be used in alternative embodiments of the present invention if the fluid has the desired viscosity and satisfies the other desired properties.

These most preferred base fluids have been found to offer several advantages in disc drive applications over conventional petroleum-based hydrocarbons that are in standard fluid lubricants. These base fluids have a viscosity which is less dependent on temperature, a lower evaporation, a lower vapor pressure, a low migration, an improved oxidation resistance, a similar boundary performance which can be enhanced easily with additives, a better compatibility with other materials in the disc drive and a better control of all properties due to a known pure chemical composition. These fluids therefore minimize degradation of the head and disc interface and provide a long life for the bearing and the disc drive.

In a preferred embodiment, the base fluids are blended to obtain a precise absolute viscosity between 4 and 10 centipoise (cP) at 70 degrees Celsius, a viscosity index of at least 110 and an evaporation range of less than $1.0 \times 10^{-3}$ mg/day-$mm^2$, based on a volume to surface area ratio (V/A) of about 1.9–2.0 mm.

In addition, the base fluids are selected such that the contribution of the base fluids to the sticking friction ("stiction") between the head and the disc, due to outgassing of the fluid from the bearing to the disc, is preferably similar to or less than the contribution of the existing chemicals or lubricants used in the disc drive under various conditions such as a hot or humid conditions. These chemicals and lubricants include grease and ferrofluidic seals, for example.

2. Blending the Lubrication Fluid With Selected Additives

In another aspect of the present invention, the lubrication fluid includes a mixture of a high viscosity index base fluid (or a blend of base fluids) and additives which are selected such that the blend is effective for resisting catalytic degradation while being compatible with the head-disc interface.

The viscosity of the lubrication fluid in a hydrodynamic bearing drops with an increase in temperature. This causes a drop in the power dissipation and the bearing load capacity for a fluid having a given thickness. In disc drive applications having miniature hydrodynamic bearings, large variations in power dissipation and bearing load capacity are unacceptable.

Viscosity index (VI) is an arbitrary method of expressing the viscosity-temperature sensitivity of a lubricant, and is often interpreted as the temperature dependency of the viscosity. A higher viscosity index for a fluid having a given viscosity indicates that the viscosity of the fluid varies less with temperature. Because power consumption is a critical parameter for miniature hydrodynamic bearings in disc drives, a high VI index is desirable. Typical viscosity indices for several classes of fluids are shown in Table 1, below:

| Fluid Chemical Class | Available VI Range |
| --- | --- |
| Refined Paraffinic Petroleum | 90–110 |
| Synthetic Hydrocarbon (Polyalpholefin) | 120–170 |
| Synthetic Ester (Diester) | 120–200 |
| Synthetic Ester (Polyol) | 115–200 |
| Perfluoropolyether | 90–320 |

Ester fluids contain oxygen as well as hydrogen and carbon, and some ester fluids offer unique advantages in disc drive applications over natural and synthetic hydrocarbon fluids. These advantages include a higher viscosity index, a higher resistance to oxidation, improved boundary lubrication properties, lower migration compared to synthetic hydrocarbons and lower evaporation.

For example, commercially available diester fluids have a high VI index and good resistance to oxidation, but have poor resistance to catalytic degradation in metal-to-metal contact. This limits the use of commercially available diester fluids in miniature hydrodynamic bearings where the oil volume is so small that even a slight break down adversely effects the bearing properties.

Commercially available fluids do not have adequate metal deactivating additives to last the lifetime of the bearing. In addition, most commercially available fluids have components that are not compatible with the head-disc interface. Often, the exact composition of commercially available fluids is not controlled by the manufacturer. Use of these fluids can cause unintended degradation of the disc drive performance.

The lubrication fluid of the present invention includes a blend of a high VI index base fluid, such as a diester fluid or a polyalphaolefin, and a combination of additives which are selected to provide the fluid with anti-oxidation, anti-corrosion and metal-deactivating properties such that the fluid is markedly more resistant to catalytic degradation than commercially available ester and/or synthetic hydrocarbon blends while being compatible with the head-disc interface.

Preferred types of antioxidants include nitrogen and oxygen containing inhibitors, such as an amine (arylamine), a phenol or a mixture of both. Most preferred types of antioxidants include butylated hydroxytoluene (liquid hindered phenol), alkylated diphenyl amine, phenyl alpha naphthylamine or combination of two or more of these antioxidants. Preferred treatment levels of these additives in the lubrication base fluid are 0.25% to 3% by mass.

Preferred types of rust and corrosion inhibitors, or metal passivators, include metallic sulfonate, long chain amines, carboxylic acid derivatives, thiadiazole and triazole derivatives and amine phosphates. Most preferred types include synthetic or petroleum calcium sulphonate, synthetic or petroleum barium sulphonate, alkenyl succenic acid derivatives and triazole derivatives. Preferred treatment levels of these additives in the lubrication base fluid are 0.02% to 0.5% by mass.

The lubrication fluid of the present invention further includes an additive for improving antiwear properties, high pressure metal contact properties and friction properties. Preferred additives of this type include, dialkyl dithiophosphates, alkyl and aryl disulphides and polysulphides, dithiocarbamates, salts of alkylphosphoric acid, molybdenum complex, neutral phosphate ester (triaryl and trialykl) such as triphenyl phosphate, or combination of two or more of these additives. Most preferred antiwear additives include, zinc dialkyl dithiophosphate, molybdenum disulphide, liquid amine phosphate and propylated and butylated triphenyl phosphates. Preferred treatment levels of these additives in the lubrication base fluid are 0.1% to 4% by mass.

A blend of a high VI index diester base oil and/or a synthetic hydrocarbon with a selection of the above-additives obtains a hydrodynamic fluid that is markedly more resistant to catalytic degradation than commercially available ester or synthetic hydrocarbon blends. Various blends were tested and were found to be compatible with the head-disc interface. These blends did not cause any significant increase in the sticking friction between the head and the disc and did not cause other interference with the head-disc interface. The blends also proved to be superior to refined paraffinic petroleum fluids in power consumption and lifetime under heavy loads and at elevated temperatures.

3. Application of High Shear Strength Viscosity Index Improved Fluids

In another aspect of the present invention, the lubrication fluid includes a mixture of a base fluid and high shear-resistant viscosity modifiers ("VI improvers"). VI improvers reduce the temperature dependence of the viscosity of the base fluid. The temperature dependence of viscosity is extremely important, and a high temperature dependence is usually undesirable to the function of miniature bearings for spindle motors. In order to minimize this effect, selected commercially available polymers were blended with a base fluid according to the present invention, which resulted in a measured improvement in the temperature-power consumption curves in the spindle motor. Power consumption was observed to be less dependent upon temperature.

In a preferred embodiment of the present invention, given an otherwise suitable base fluid having an inadequate temperature-viscosity behavior, a high molecular weight soluble polymer is added to the base fluid at a concentration of 5–50% by weight. The molecular weight of the polymer is preferably 10,000–1,000,000 Daltons. Preferred polymer VI improvers include, but are not limited to, polyacrylate, polyisoprene and polystyrene.

Under conditions encountered in miniature hydrodynamic bearings according to the present invention, the shear rate is more than $10^6$ per second. The shear rate is defined as the rate of velocity change of the bearing working surface with respect to the width of the gap in the bearing (clearance C shown in FIG. 3). The shear conditions between bearing surfaces limit the life of VI improvers by breaking down the polymers. Because the VI effect depends upon, among other factors, the length of the polymer chain, the effectiveness of the VI improver is reduced by shear breakdown.

In a more preferred embodiment of the present invention, the selected polymer VI improver belongs to a class of polymers that are highly resistant to shear breakdown, with a tensile strength of the solid polymer being at least 10,000 PSI and a resistance to thermal degradation of at least 250 degrees F. The polymer thus has a shear strength. This class of polymers includes, but is not limited to, soluble forms of such materials as polyphenylene sulfide, polyetheretherketone, and polyetherimide.

In a still more preferred embodiment, the solid polymer has a tensile strength of at least 14,000 PSI and a resistance to thermal degredation above 500 degrees F. This class of polymers includes, but is not limited to, polyamide-imide, polyimide, polybenzimidazole, and liquid crystal polymer. In yet a more preferred embodiment, the solid polymer has a tensile strength of at least 20,000 PSI and a resistance to thermal degredation above 700 degrees F. This class of polymers includes, but is not limited to, buckytubes and other buckminsterfullerene carbon forms.

In a most preferred embodiment, the polymer VI improver has the properties of the previous groups and is functionalized or chemically modified to provide anti-oxidant and metal deactivation protection to the fluid, as discussed above.

Although the present invention has been described with reference to preferred embodiments, workers skilled in the art will recognize that changes may be made in form and detail without departing from the spirit and scope of the invention.

What is claimed is:

1. A disc drive data storage system, comprising:
    a housing;
    a central axis;
    a stationary member which is fixed with respect to the housing and coaxial with the central axis;

a stator which is fixed with respect to the housing;

a rotatable member which is rotatable about the central axis with respect to the stationary member;

a rotor supported by the rotatable member and magnetically coupled to the stator;

at least one data storage disc attached to and coaxial with the rotatable member; and a hydro bearing interconnecting the stationary member and the rotatable member and comprising a lubricant circulated among working surfaces of the hydro bearing, the lubricant comprising a blend of base fluids, wherein one of the base fluids in the blend has a viscosity that is greater than a selected viscosity, another of the base fluids in the blend has a viscosity that is less than the selected viscosity and the blend of base fluids has an absolute viscosity which is between 4 and 10 centipoise at 70° C., and a viscosity index of at least 110.

2. The disc drive data storage system of claim 1 wherein the blend of base fluids has an evaporation range of less than $1.0 \times 10^{-3}$ mg/day-mm$^2$, based on a volume to surface area (V/A) ratio of about 1.9–2.0 mm.

3. The disc drive data storage system of claim 1 wherein the blend of base fluids comprises base fluids selected from the group consisting of perfluoropolyethers, esters, synthetic hydrocarbons and mineral hydrocarbons.

4. The disc drive data storage system of claim 3 wherein the blend of base fluids comprises base fluids selected from the group consisting of diesters, polyol esters and polyalphaolefins.

5. The disc drive data storage system of claim 1 wherein the blend of base fluids comprises a blend of at least two esters only, which have different kinematic viscosities.

6. The disc drive data storage system of claim 1 wherein the blend of base fluids comprises a blend of at least two polyalphaolefins only, which have different kinematic viscosities.

7. The disc drive data storage system of claim 1 wherein the blend of base fluids comprises a blend of at least one ester and at least one polyalphaolefin only, which have different kinematic viscosities.

8. The disc drive data storage system of claim 1 and further comprising:

an actuator; and a head which is supported by the actuator proximate to the data storage disc for communicating with the disc, wherein the head and disc have an interface and the blend of fluids is compatible with the interface.

9. A disc drive comprising:

a housing;

a central axis;

a stationary member which is fixed with respect to the housing and coaxial with the central axis;

a stator which is fixed with respect to the housing;

a rotatable member which is rotatable about the central axis with respect to the stationary member;

a rotor supported by the rotatable member and magnetically coupled to the stator;

at least one data storage disc attached to and coaxial with the rotatable member; and a hydro bearing interconnecting the stationary member and the rotatable member and comprising a lubricant circulated among working surfaces of the hydro bearing, the lubricant comprising a blend of n base fluids which has an absolute viscosity $\mu_B$, which is between 4 and 10 centipoise at 70° C., and a viscosity index of at least 110, wherein n is an integer greater than one and wherein the base fluids are blended according to the following relation, $$\mu_{B \text{ at } T=T_c} = \nu_1 \times \rho_1 \times \chi_1 + \mu_2 \times \rho_2 \times \chi_2 \ldots + \ldots \nu_n \times \rho_n \times \chi_n$$

where

T is temperature, $T_c$ is the temperature at which the absolute viscosity is desired, $\nu_n$ is the kinematic viscosity of base fluid n, $\rho_n$ is the density of base fluid n, $\chi_n$ is the weight percent fraction of base fluid n, $\chi_1 + \chi_2 \ldots + \ldots \chi_n = 1$, and $\nu_1 > \nu > \nu_2$, where $\nu$ is the kinematic viscosity of the blend of base fluids.

10. The disc drive of claim 9 wherein the blend of base fluids has an evaporation range of less than $1.0 \times 10^{-3}$ mg/day-mm$^2$, based on a volume to surface area (V/A) ratio of about 1.9–2.0 mm.

11. The disc drive of claim 9 wherein the blend of base fluids comprises base fluids selected from the group consisting of perfluoropolyethers, esters, synthetic hydrocarbons and mineral hydrocarbons.

12. The disc drive of claim 11 wherein the blend of base fluids comprises base fluids selected from the group consisting of diesters, polyol esters and polyalphaolefins.

13. The disc drive of claim 9 wherein the blend of base fluids comprises a blend of at least two esters only, which have different kinematic viscosities.

14. The disc drive of claim 9 wherein the blend of base fluids comprises a blend of at least two polyalphaolefins only, which have different kinematic viscosities.

15. The disc drive of claim 9 wherein the blend of base fluids comprises a blend of at least one ester and at least one polyalphaolefin only, which have different kinematic viscosities.

16. A disc drive data storage system, comprising:

a housing;

a central axis;

a stationary member which is fixed with respect to the housing and coaxial with the central axis;

a stator which is fixed with respect to the housing;

a rotatable member which is rotatable about the central axis with respect to the stationary member;

a rotor supported by the rotatable member and magnetically coupled to the stator;

at least one data storage disc attached to and coaxial with the rotatable member; and a hydro bearing interconnecting the stationary member and the rotatable member and comprising a lubricant circulated among working surfaces of the hydro bearing, the lubricant comprising a blend of base fluids, wherein the blend of base fluids has a viscosity index of at least 110, an absolute viscosity between 4 and 10 centipoise at 70° C., and an evaporation range of less than $1.0 \times 10^{-3}$ mg/day-mm$^2$, based on a volume to surface area (V/A) ratio of about 1.9–2.0 mm.

* * * * *